United States Patent [19]
Coulson

[11] Patent Number: 4,620,389
[45] Date of Patent: Nov. 4, 1986

[54] VINE TRELLIS ASSEMBLY

[75] Inventor: Don J. Coulson, Huntington Beach, Calif.

[73] Assignee: North Star Company, Inc., Gardena, Calif.

[21] Appl. No.: 738,278

[22] Filed: May 28, 1985

[51] Int. Cl.$^4$ ............................................. A01G 17/06
[52] U.S. Cl. ................................................ 47/46
[58] Field of Search ................ 47/44, 45, 46, 47; 248/316.7; 24/563; 403/399, 397, 395; 256/48, 54

[56] References Cited

U.S. PATENT DOCUMENTS

| 511,378 | 12/1893 | Van Wagoner | 256/48 |
| 1,463,353 | 7/1923 | White | 403/399 |
| 3,690,033 | 9/1972 | Lewis et al. | 47/46 |

FOREIGN PATENT DOCUMENTS 595743  5/1975  Switzerland ........................... 47/46

Primary Examiner—Richard T. Stouffer
Assistant Examiner—Bradley M. Lewis
Attorney, Agent, or Firm—Keith D. Beecher

[57] ABSTRACT

A trellis assembly for grape vines, and other vines, and which includes an upright stake, a cross-arm secured to the upper end of the stake, tensioned trellis wires which are received in slotted holes at the ends of the cross-arm in a sliding relationship with the cross-arm, and clips mounted on the trellis wires at the ends of the cross-arm which extend over the ends of the cross-arm and engage the trellis wires to prevent any tendency for the cross-arm to turn and collapse due to the weight of the vines supported thereby.

2 Claims, 2 Drawing Figures

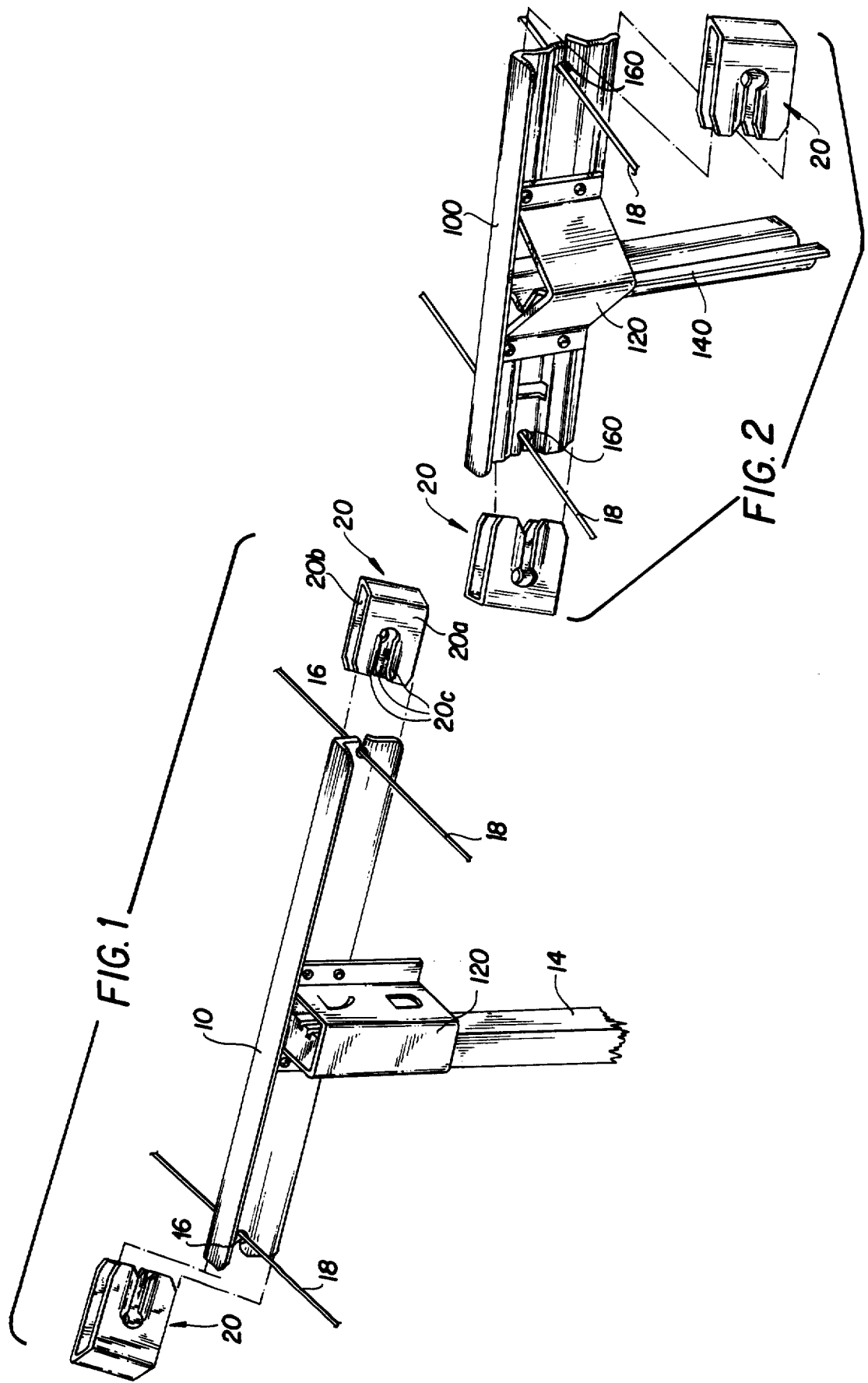

VINE TRELLIS ASSEMBLY

BACKGROUND OF THE INVENTION

American grapes are usually grown on tensioned wire trellises. The wire trellises, in accordance with the prior art practice, are placed under high tension and supported on wooden cross-arms which, in turn, are nailed to the upper ends of wooden stakes. The stakes are driven into the ground, and are positioned in rows. The tensioned trellis wires are stapled to the ends of the cross-arms and extend along each row of the vineyard to provide trellises for the vines.

Copending application Ser. No. 202,784 filed Oct. 31, 1980 in the name of the present inventor, now abandoned, seeks to overcome some of the problems encountered by the use of wooden stakes and wooden cross-arms, and provides cross-arms formed of metal, such as galvanized iron, which are mounted on wooden stakes while the stakes are upright in the ground. The ends of the metal cross-arms in the assembly described in the copending application are slotted to receive the tensioned trellis wires, so that no stapling of the trellis wires to the cross-arms is required, as is the case with the wooden cross-arms.

U.S. Pat. No. 4,329,811, which issued May 18, 1982, in the name of the present inventor, discloses an all-metal grape stake which includes a metal upright member and which also includes a cross-arm in the form of a metal strip which is attached to and extends across the upper end of the upright member. The ends of the cross-arm likewise are slotted to receive the tensioned trellis wires in a sliding relationship.

Problems have arisen with respect to the metal cross-arms such as are used in the two assemblies discussed above, in that the cross-arms are slidable along the tensioned trellis wires. This means that any irregularities in the vine load on the individual cross-arms have a tendency to cause the arms to turn and collapse, because the hat section which connects the cross-arm to the top of the stake has little resistance to torque and buckles in the presence of angular movement. The collapse of any one of the cross-arms creates a domino effect, since it loads the adjacent cross-arms causing them also to collapse, and so on.

In the embodiment of the invention to be described, means in the form of clips are provided which are mounted over the ends of the cross-arms and which have slotted sides which bite into the tensioned trellis wires to inhibit sliding movement of the ends of the cross-arms along the trellis wires. This causes the trellis wires themselves to contribute to the integrity of the overall assembly, and to obviate any tendency for the cross-arms to slide along the trellis wires and collapse.

In the usual installation the trellis wires are formed, for example, of high tensile galvanized steel, and they are placed under a tension of the order of 200,000 psi. The clips used in the assembly of the present invention may be formed of heat-treated spring steel.

The combination of the clips and the trellis wires in conjunction with the cross-arms and upright stakes provide a strong trellis assembly in which there is no tendency for the cross-arms to turn and collapse even in the presence of high off-balance loads of the vines.

A feature of the invention is that existing trellis assemblies using metal cross-arms may be easily retrofitted to incorporate the teachings of the invention, by driving clips of the type to be described over the slotted ends of the cross-arms and into engagement with the tensioned trellis wires to inhibit any sliding movement of the cross-arms along the wires. The only tool required for this operation is a hammer.

BRIEF DESCRIPTION OF THE DRAWINGS

FIG. 1 is a perspective representation of the stake assembly disclosed in copending application Ser. No. 202,784, and which involves a metal cross-arm mounted on a wooden stake; and FIG. 2 is a perspective representation of the stake assembly disclosed in U.S. Pat. No. 4,329,811 in which both the stake and cross-arm are metal.

DETAILED DESCRIPTION OF THE ILLUSTRATED EMBODIMENT

In the assembly of FIG. 1, and as described in the copending application Ser. No. 202,784, a metal cross-arm 10 is provided having a metal hat section 12 mounted to the cross-arm. The cross-arm is mounted on the top of a wooden stake 14 by hammering the hat section over the stake. Slots 16 are provided at the ends of the cross-arm 10 for receiving tensioned trellis wires 18 in a sliding relationship. As described above, this creates problems in that any irregular load on the cross-arm causes it to turn and slide along the trellis wires which often results in a collapse of the assembly.

In accordance with the present invention, an appropriate means such as a clip 20 is mounted on each trellis wire 18 at each end of the cross-arm. The clip 20 has spaced and parallel sides 20a and 20b which extend on opposite sides of the corresponding end of cross-arm 10, and slots are provided in the sides for receiving the corresponding trellis wire 18. The edges 20c of the slots 20a, 20b are bent outwardly to form jaws which bite into the trellis wire so as to prevent any movement of the clip along the trellis wire and to enable the clip to inhibit any rotary movement of the cross-arm 10 about the axis of stake 14.

In the embodiment of FIG. 2, an all-metal assembly is shown which, as mentioned above, is similar to the assembly disclosed in U.S. Pat. No. 4,329,811.

In the assembly of FIG. 2, a metal cross-arm 100 is mounted on the top of a metal stake 140 by means of a triangular-shaped hat section 120 mounted on the cross-arm. As described in the patent, the cross-arm 100 is mounted on the top of the stake 140 by inserting the stake into the hat section 120, and turning the stake to the position shown in FIG. 2.

As in the previous embodiment, the cross-arm 100 is provided with slots 160 which receive the trellis wires 18 in a sliding relationship.

In accordance with the present invention, the clips 20 are mounted at the ends of the cross-arm 100 to prevent any movement of the ends of the cross-arm along the trellis wires, and thereby to prevent collapse of the assembly.

The invention provides, therefore, a simple assembly which overcomes problems inherent in present-day grape stake assemblies with metal cross-arms and which enables the tensioned trellis wires to assist in the integrity of the assembly, and to eliminate any tendency for the cross-arms to turn and collapse.

It will be appreciated that while a particular embodiment of the invention has been shown and described, modifications may be made. It is intended in the claims to cover all modifications which come within the true spirit and scope of the invention.

I claim:

1. A trellis assembly for supporting vines comprising: a stake, at least one tensioned trellis wire, a cross-arm attached to the stake and having a slot at at least one end for slidably receiving the trellis wire, and a clip mounted on said end of said cross-arm and engaging said trellis wire to inhibit sliding movement of said cross-arm along said wire, said clip embracing the end of said cross-arm and having a pair of spaced and parallel side members extending on either side of the cross-arm, said side members having aligned slots therein extending inwardly from the respective ends thereof for receiving the trellis wire, the edges of the slots of said side members of said clip being bent to form jaws which bite into said trellis wire.

2. The assembly defined in claim 1, in which said clip is formed of heat treated spring steel.

* * * * *